(12) United States Patent
Counts

(10) Patent No.: US 8,425,291 B2
(45) Date of Patent: Apr. 23, 2013

(54) GAME BUILDER FOR MOBILE DEVICE-BASED GAMES

(75) Inventor: Scott J. Counts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/348,014

(22) Filed: Jan. 11, 2012

(65) Prior Publication Data

US 2012/0115615 A1 May 10, 2012

Related U.S. Application Data

(63) Continuation of application No. 11/352,810, filed on Feb. 13, 2006, now Pat. No. 8,123,599.

(51) Int. Cl.
*A63F 9/24* (2006.01)
(52) U.S. Cl.
USPC .............................................. 463/1
(58) Field of Classification Search ............... 463/1, 29, 463/39–42
See application file for complete search history.

(56) References Cited

U.S. PATENT DOCUMENTS

| | | |
|---|---|---|
| 2002/0049729 A1 | 4/2002 | Umekawa |
| 2002/0086729 A1 | 7/2002 | Emmerson et al. |
| 2003/0003988 A1 | 1/2003 | Walker et al. |
| 2003/0060284 A1 | 3/2003 | Hamalainen et al. |
| 2003/0229900 A1* | 12/2003 | Reisman .......................... 725/87 |
| 2004/0031058 A1* | 2/2004 | Reisman ......................... 725/112 |
| 2005/0202861 A1* | 9/2005 | Dougherty et al. ............... 463/1 |
| 2006/0123053 A1* | 6/2006 | Scannell, Jr. ............... 707/104.1 |
| 2007/0129123 A1* | 6/2007 | Eryou et al. ...................... 463/1 |
| 2007/0191100 A1 | 8/2007 | Counts |
| 2007/0275705 A1 | 11/2007 | Lau et al. |

OTHER PUBLICATIONS

Pacmanhattan; http://pacmanhattan.com; 1 page; last viewed May 15, 2006.
Area/Code http://playareacode.com/; 1 page; last viewed May 15, 2009.
Can you see me now? http://www.canyouseemenow.co.uk/cardiff/en/intro.php; 1 page; last viewed May 15, 2006.
Kamida; http://kamida.com/; 1 page; last viewed May 15, 2006.
Nintendo, "Golden Eye 007", released Aug. 1997.

* cited by examiner

*Primary Examiner* — David L Lewis
*Assistant Examiner* — Eric M Thomas
(74) *Attorney, Agent, or Firm* — Lee & Hayes, PLLC

(57) ABSTRACT

As described herein, mobile device games may be constructed via a website from customizable atomic rule-based units, and also supports the reuse and remixing of game components by a game creator, members of an online community, or by any other user. Once composed, the game can be played via player mobile devices, which send content to a server or a peer device that hosts the game rule statements, and can trigger distribution of new content, rules, or other information.

20 Claims, 16 Drawing Sheets

GAME BUILDER FOR MOBILE DEVICE-BASED GAMES

PRIORITY APPLICATION

This application is a continuation of and claims priority from U.S. patent application Ser. No. 11/352,810, titled "Game Builder For Mobile Device-Based Games", filed on Feb. 13, 2006, which is herein incorporated by reference.

BACKGROUND

The advent of global communications networks (e.g., the Internet) has served as a catalyst for the ubiquity of portable computing devices that can access and communicate information from almost anywhere in the world. Similarly, the rapid advances in cellular networks and products have followed suit making cell phones and cell-capable devices just as pervasive, if not more pervasive, than portable computing devices. In response to the huge commercial opportunities that have become available by such networks, companies are rapidly moving to provide the infrastructure and products that can access both the cellular networks as well as the IP networks.

Not only has the Internet become a principal mechanism for conducting business, but other forms of user interaction can be offered. For example, the online computer gaming business has skyrocketed to a multi-billion dollar industry, with no end in sight, thereby providing a form of leisure activity for millions of users while also providing a boon to companies involved in such an industry. Such games typically only involve virtual world interaction between players, and require the user/player to purchase the client version of the game which thereafter can provide access to Internet servers supporting multiplayer mode gaming with other Internet users.

Historically, video games are very expensive to develop in terms of resources, testing, compatibility programming, and follow-up due to changing system requirements, etc., and depend in large part on the "wow" factor and expense of 3D graphics. With such onerous barriers of one-off game development, industry is searching for new ways of making gaming more affordable and thereby reaching a wider audience of gaming customers.

A new type of gaming includes mixed physical world-virtual world (or physical-virtual) gaming Such gaming can be provided via mobile devices (e.g., cell phones) and is a nascent social technology in which participants play a mobile game in physical space that is tied in some way to a virtual world component. Technologies supporting this type of gaming currently are limited to a few experimental systems that support one-off game types. However, there is no existing system that supports general-purpose mobile gaming.

SUMMARY

The following presents a simplified summary in order to provide a basic understanding of some aspects of the disclosed innovation. This summary is not an extensive overview, and it is not intended to identify key/critical elements or to delineate the scope thereof Its sole purpose is to present some concepts in a simplified form as a prelude to the more detailed description that is presented later.

The system presented herein allows for mobile games to be constructed, from a website, for example, from customizable atomic rule-based units. Because these games are composed of rule-based units (and combinations of rule-based units), this system also supports the reuse and remixing of game components by the initial game creator, by members of an online community, and/or by any other member of the general public.

The game builder architecture also addresses automated game play. Once the game has been composed, it can be played via participant's mobile-capable devices (e.g., cell phones and portable computers), which send content to a server that houses the game rules, and can trigger the distribution of new content, rules, or other information based on content received. For example, a scavenger hunt style game can contain a rule that when a player sends a message containing a word or content that solves one part of the scavenger hunt, the rule executes and outputs a result causing the system to push to appropriate player's mobile phones the next clue in the scavenger hunt sequence.

Accordingly, the invention disclosed and claimed herein, in one aspect thereof, comprises a gaming system comprising an interface component for providing access to the system, a build component for constructing a rule and/or rule units (or blocks of rules) for execution for game setup and/or during game play, and an execution component for executing the rule and/or rule units based on data received from a mobile computing device utilized during the game play.

In another aspect, the subject innovation facilitates mixed physical-virtual gaming via mobile devices. Moreover, games can be built from atomic rule-based gaming units, thereby facilitating reusable game rules which can be combined to make new games or update existing games to greater efficiency. Furthermore, game play is automated, in that play does not require human oversight.

In yet another aspect, game creation and play can occur via any number of clients, can occur on any number of clients, and can be via client/server and/or peer-to-peer architectures.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
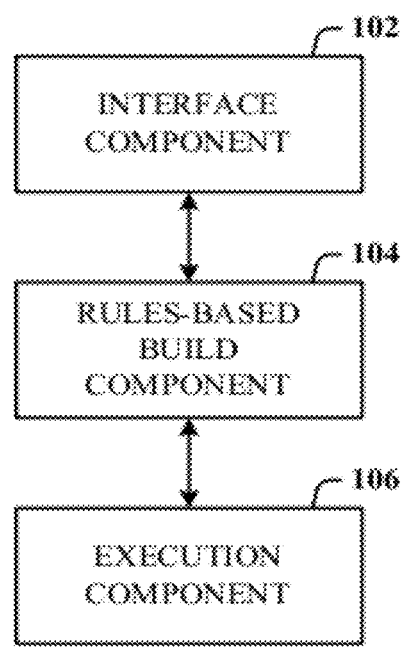
FIG. 1 illustrates a computer-implemented gaming system in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The innovation presented herein allows for games to be constructed and played via at least mobile communications devices (e.g., cell phones, PDAs, ... ), and via a website for example, from customizable atomic rule-based rules and/or rule-based units. Because these games are composed of separate rules and/or rule-based units (and/or combinations of rule-based units), this system also supports the reuse and remixing of game components by the initial game creator or by members of an online community or simply by any other member of the general public. The disclosed technology supports all-purpose game creation for at least mobile device-based gaming by allowing users to convenient access to a game-building architecture and reusable rule-like components.

Referring initially to the drawings, FIG. 1 illustrates a gaming system 100 in accordance with the subject innovation. The system 100 can comprise an interface component 102 for providing access to the system 100, a build component 104 for constructing a rule and/or rule units (or blocks of rules) for execution for game setup and/or during game play, and an execution component 106 for executing the rule and/or rule units based on data received from a computing device utilized during the game play.

Following is an example of a game that can be constructed and played. Consider a scavenger hunt game. The game creator can begin by creating teams for game play. All content distributed to game players can be sent to either an individual player's mobile device or the mobile devices of a group (or team). Game play can be based on a series of "if-then" rules (or statements). For example, players using mobile communications devices (e.g., cell phones, PDAs, portable computers, ... ) can find clues in the physical world (e.g., at buildings, in rooms, at a park, or other locations) based on hints received, and transmit the clue information to a central location (e.g., a game server). The rules can be built into the game engine which responds by sending out the appropriate follow-up clues.

The game creator may decide whether the clues need to be followed in order or can be solved out of order. Additional "if ... then" rules can be configured to, for example, reconfigure subgroups of players based on responses. The game creator may choose to add other rules, such as a location-based trigger that sends clues to players when they are at a specified location. Finally, the game creator can specify the game-winning rules, such as finding the final clue in the scavenger hunt.

In another aspect, the rules and/or rules units can be configured to be reusable for other games. It is to be appreciated that game engines can be configured to provide core game functions such as scoring, rules processing, and so on, wherein such core functions can be reused in different games. This mitigates recreation of functions that can be common to gaming thereby facilitating quicker game creation and play.

In one implementation, the rules-based gaming system 100 can be hosted on a website such that users can access the website from most any network location, for example, via a cellular device in communication with a cellular network and/or an IP-capable computing device via an IP network (e.g., the Internet).

Figure 2:
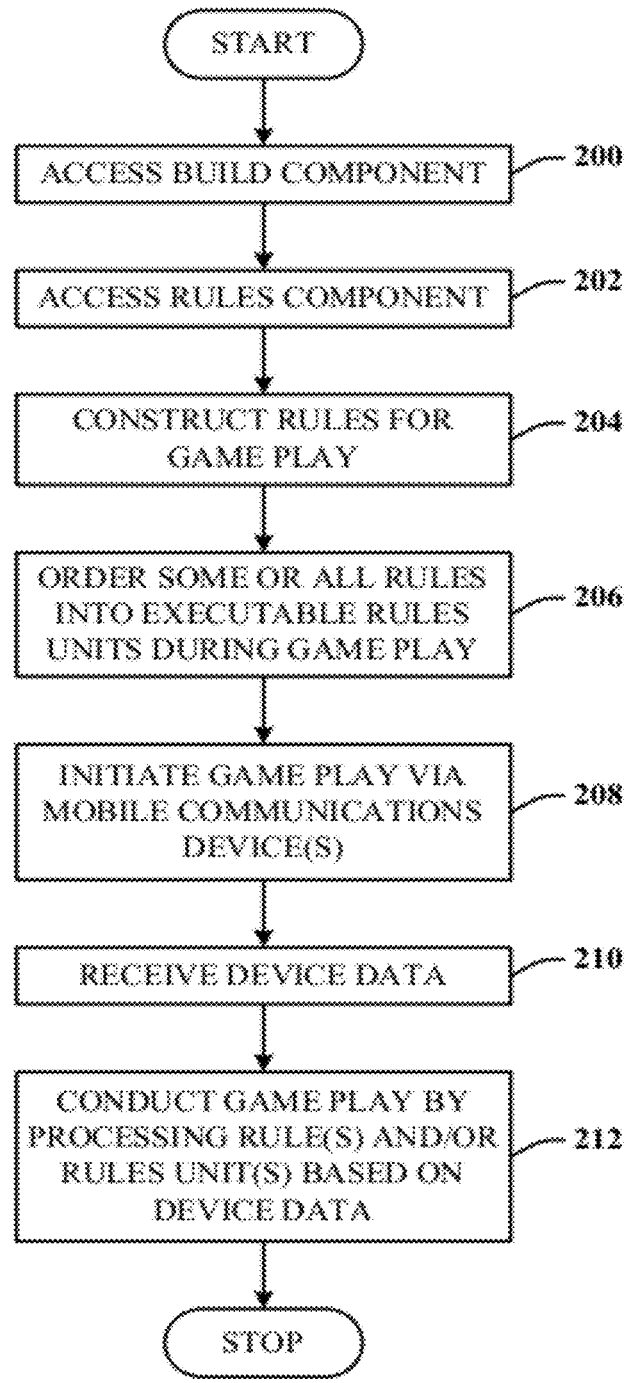
FIG. 2 illustrates a methodology of facilitating gaming in accordance with an innovative aspect.

FIG. 2 illustrates a methodology of facilitating gaming in accordance with an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a user accesses the build component through a user interface. This can be via a browser application that facilitates logging in to a server that hosts the gaming system. At 202, the user can further access a rules component that facilitates rule creation and execution. At 204, the user creates rules. This can be an individual rule to be executed alone, groups (or units or blocks) of rules ordered for execution as a group (unit or block), and combinations of rules groups for execution as block combinations. This is indicated at 206. The acts at 204 and 206 can also include testing and troubleshooting rules individually, as a block, and/or as a combination of blocks, to provide the desired output(s) in response to specific inputs. At 208, once all rules have been created and tested, game play can commence (via cell phones, for example). This can include pushing rules and/or other game-related information from the system location to the user play device. This can also include pushing game updates whether rules-related or not, such as user preferences, for example. At 210, device data is captured locally by the user gaming device and uploaded to the central gaming system for rules processing and thereby advancing game play. At 212, in response to the data, selected rules, rule groups and/or rule block combinations are executed to advance game play.

Figure 3:
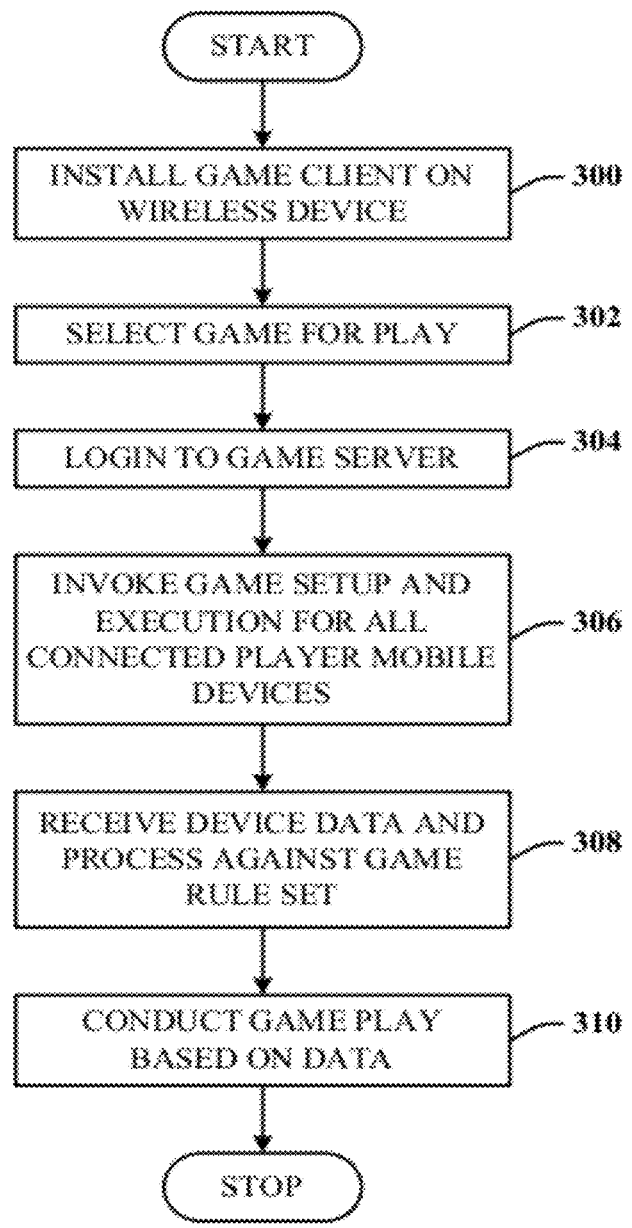
FIG. 3 illustrates a methodology of conducting game play in accordance with another aspect.

Referring now to FIG. 3, there is illustrated a methodology of conducting game play in accordance with another aspect. At 300, a game client is installed on a user device. At 302, the user can select the game to play. At 304, the user logs into the gamer server via the client. At 306, the user invokes game setup and execution for all players that are connected and/or are to connect. This can include selecting rules and/or rules blocks or units for execution during game play. At 308, device data is received at the game system server and processed against the game rules. At 310, game play is conducted based on the data and executed rules.

Figure 4:
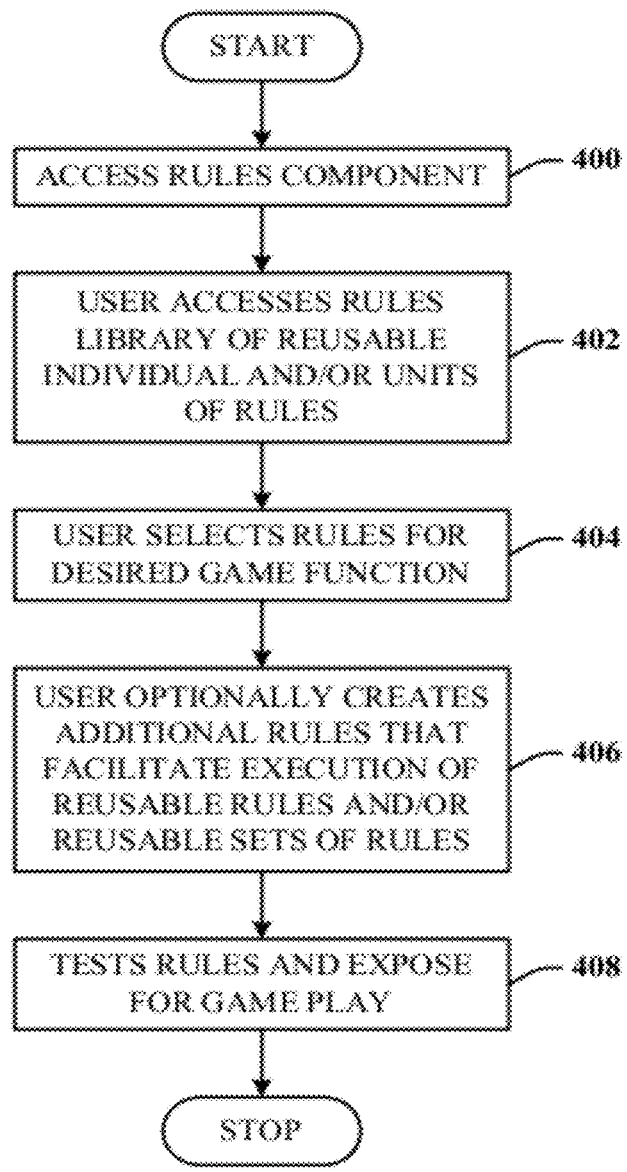
FIG. 4 illustrates a methodology of selecting reusable rules and/or rule sets for game execution in accordance with another aspect of the innovation.

FIG. 4 illustrates a methodology of selecting reusable rules and/or rule sets for game execution in accordance with another aspect of the innovation. At 400, a user accesses a rules component for rules creation and selection. At 402, the user can access a rules library that includes individual rules as well as block of rules previously constructed and tested to output the desired results based on specific inputs, for other purposes or for game execution. At 404, the user selects the rules and/or blocks of rules for the desired game function and results. At 406, the user can also create additional individual rules that facilitate execution of a separate reusable rule in combination with another reusable rule, a separate rule in combination with a reusable block of rules, and reusable blocks of rules that execute in combination with other reusable blocks or units of rules. Once selected and tested, the rules can then be exposed for game play at the central server, as indicated at 408.

Figure 5:
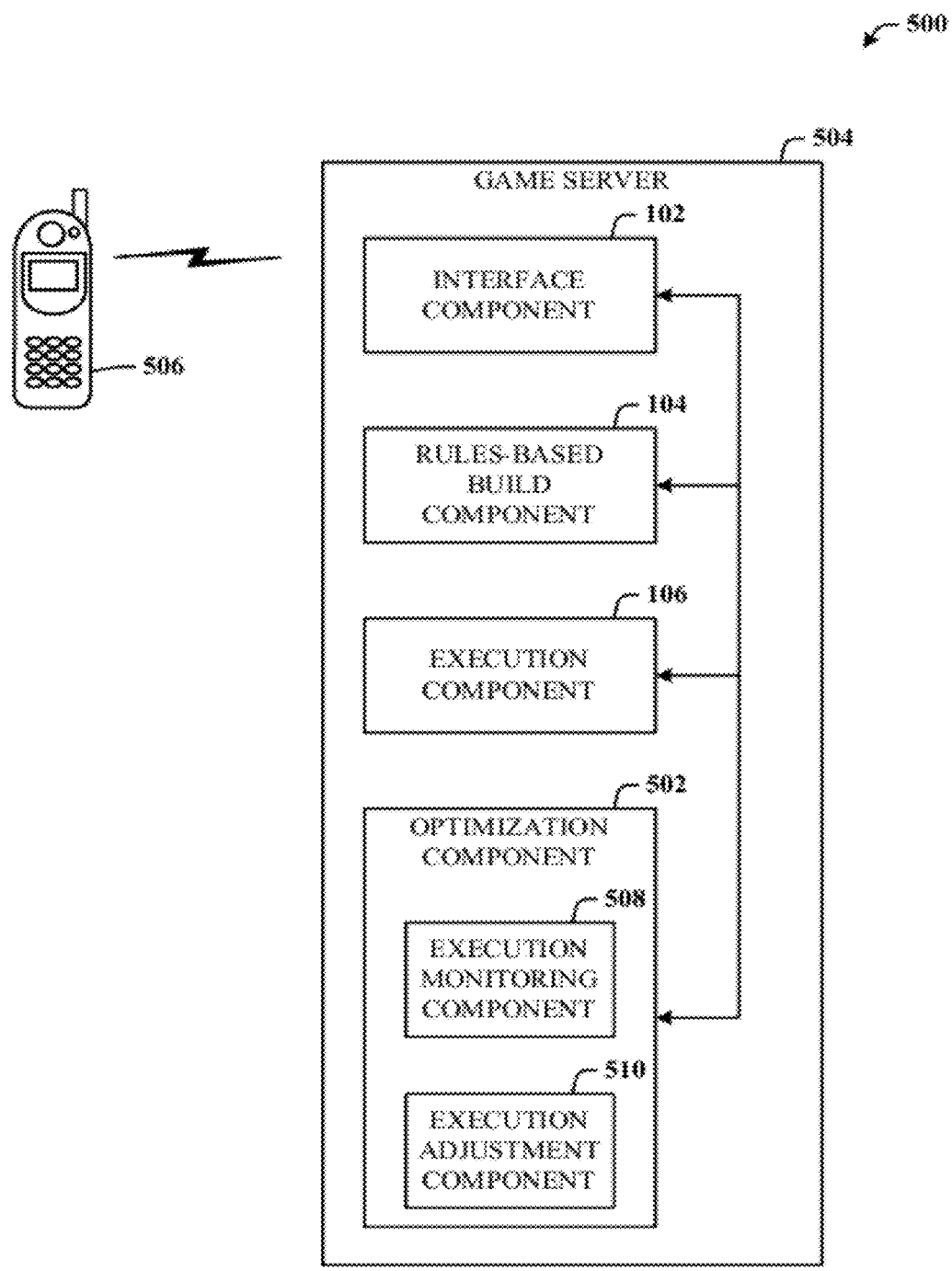
FIG. 5 illustrates a system that includes an optimization component for facilitating game play in accordance with an aspect.

FIG. 5 illustrates a system 500 that includes an optimization component 502 for facilitating game play in accordance with an aspect. The system 500 can include the interface component 102 that facilitates access to a game server 504 via a cellular telephone 506, the rules-based build component 104 for creating rules, and the execution component 106 for testing and executing rules for and during game play. Additionally, the optimization component 502 that automatically and/or dynamically makes decisions during game play based on game parameters and/or game data.

In support thereof, the optimization component 502 can further include an execution monitoring component 508 that monitors rules execution during the game and overall game execution, and coordinates rules selection and execution during game play based on received game data. Accordingly, an execution adjustment component 510 can also be provided as part of the optimization component 502 to automatically select different rules to execute during game play based on the received game data.

Alternatively, or in combination therewith, the order of rules can be changed for more efficient execution and to output the desired results. For example, if a greater number of players require a different rule or set of rules for execution than a smaller number of players, the optimization component 502 can automatically suggest this to the user during game setup and/or during game play. In another implementation, by example only, and not by limitation, if the types of player devices changes during game play, the optimization component 502 can dynamically select and execute a different rule or rule set/sets to accommodate the game play based on the types of user devices now employed.

Figure 6:
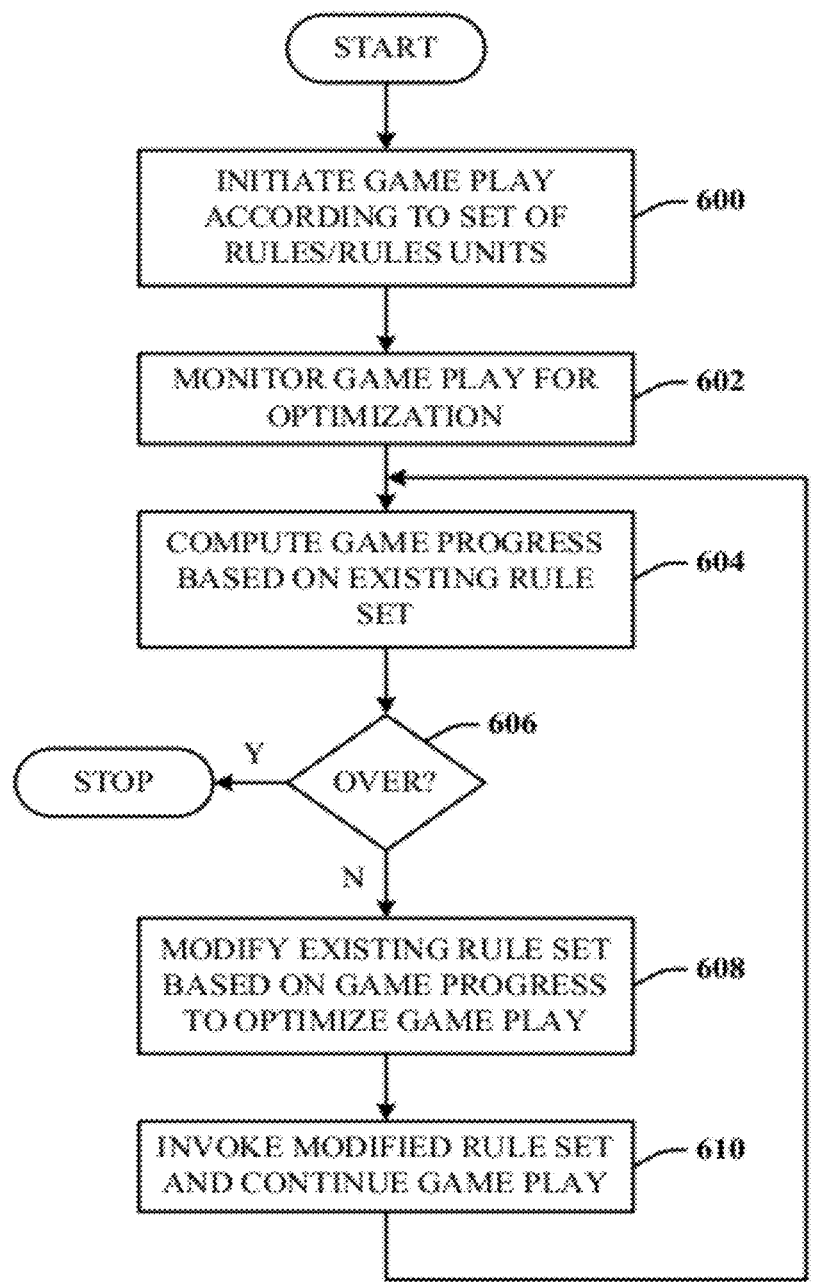
FIG. 6 illustrates a methodology of optimizing game play in accordance with the disclosed innovation.

Referring now to FIG. 6, there is illustrated a methodology of optimizing game play in accordance with the disclosed innovation. At 600, game play is initiated according to rules and/or sets of rules. At 602, game play is monitored for optimization. At 604, game progress is computed based on existing rules and/or rule sets. At 606, the system checks to determine if game play is over. If not, at 608, the existing rules and/or rule sets can be modified based on game progress and/or other parameters to optimize game play. At 610, the modified rules are invoked for game play, and game play continues. Flow can then proceed back to 604 to compute game progress based on the now new existing rules. However, if game play is over, at 606, flow terminates.

Figure 7:
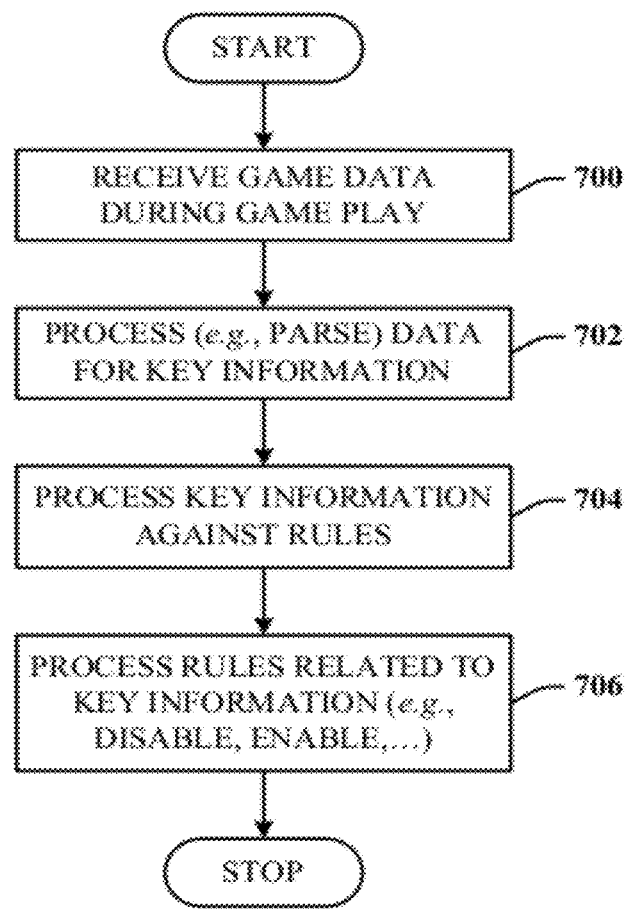
FIG. 7 illustrates a flow diagram of a methodology of processing game data to invoke rules during game play in accordance with an aspect.

FIG. 7 illustrates a flow diagram of a methodology of processing game data to invoke rules during game play in accordance with an aspect. At 700, game data is received during game play. At 702, the game data is processed for key information (or information that rules are structured to receive). If the data is text data, for example, a parsing operation can be employed that checks for key word terms that are processed to determine the state or progress of game play. Note that as described herein, the status of game play can include all facets, for example, the ranking of players at any stage of the game, the number of goals achieved during game play by any and all players, the rate at which play is progressing, the skill level of any player as computed as the game progresses, the time of day, and so on. At 704, the key information is then processed against the existing rules. At 706, the rules that are structured to receive that type of key information are selected and executed, and the corresponding rule results received in order to process the game.

Figure 8:
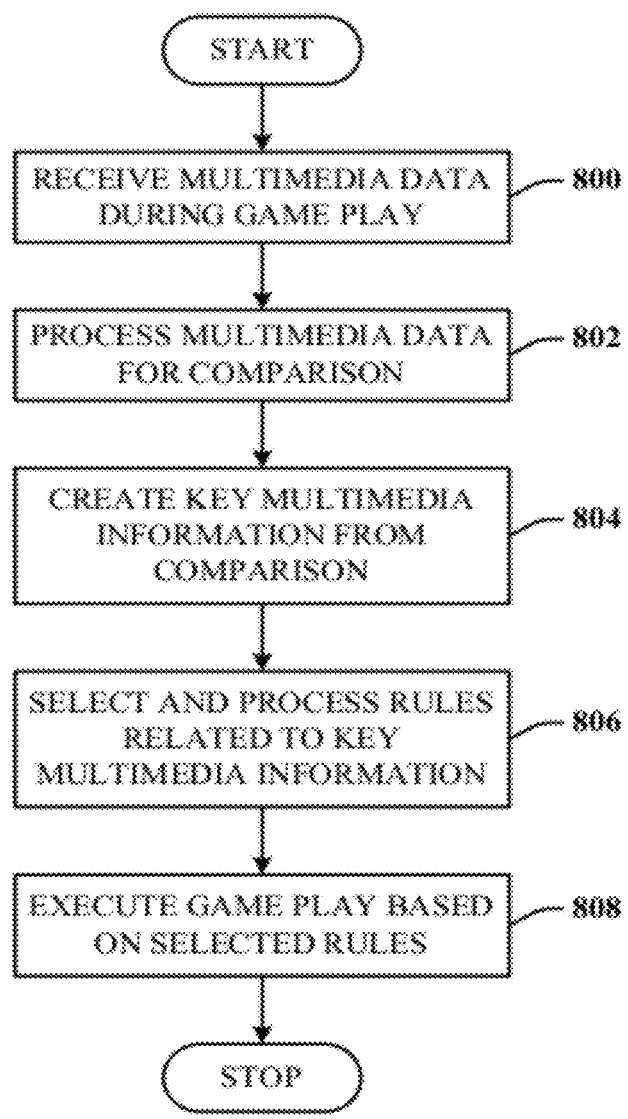
FIG. 8 illustrates a flow diagram of a methodology of processing multimedia game data for game play in accordance with an aspect.

FIG. 8 illustrates a flow diagram of a methodology of processing multimedia game data for game play in accordance with an aspect. At 800, multimedia data (e.g., images, music, text, graphics, video, audio signals, . . . ) is received from one or more user devices during game play. At 802, the multimedia game data is processed for comparison with other related game data. At 804, based on the comparison, key multimedia information is created. That is, the user could take a digital image of a setting or event, the image of which can be received and processed against a stored game image that is expected to be received during game play. If the comparison is favorable, the user can proceed in playing the game. However, if the image does not compare favorably, the user can be impeded or penalized points, for example, from advancing during game play. At 806, based on the computed key multimedia information, the rules constructed to receive such information are selected. At 808, the rules are executed to obtain the desired results.

Figure 9:
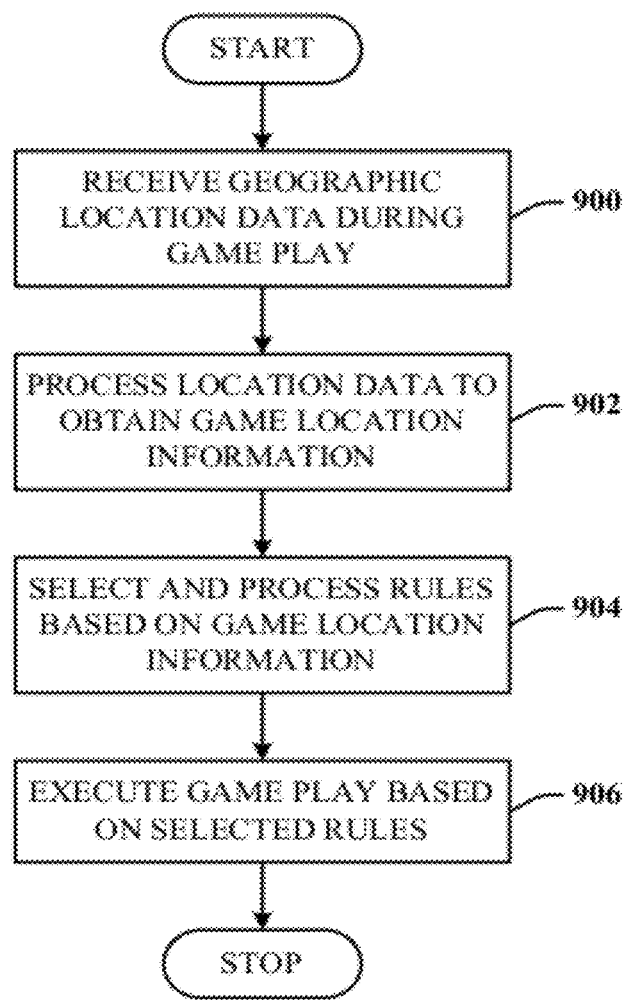
FIG. 9 illustrates a flow diagram of a methodology of processing geographic location information for game play in accordance with an aspect.

FIG. 9 illustrates a flow diagram of a methodology of processing geographic location information for game play in accordance with an aspect. At 900, the system receives geographic location information (e.g., GPS-global positioning system). This can also include other techniques for determining, generally, the location of the user device (and hence, the user). For example, triangulation can be employed, as well as signal strength measurements. At 902, the system processes the location data to obtain game location information. For example, if based on the location information, it is determined that the user is near an intersection, this can trigger rule execution to provide a new clue to the user, and/or add points to the user score. In the scavenger hunt example above, this can also trigger pushing new data to the game players when at least one of the players meets a milestone or goal. Accordingly, at 904, based on the received location information, the appropriate rules are selected, and then executed to obtain the desired results, as indicated at 906.

Figure 10:
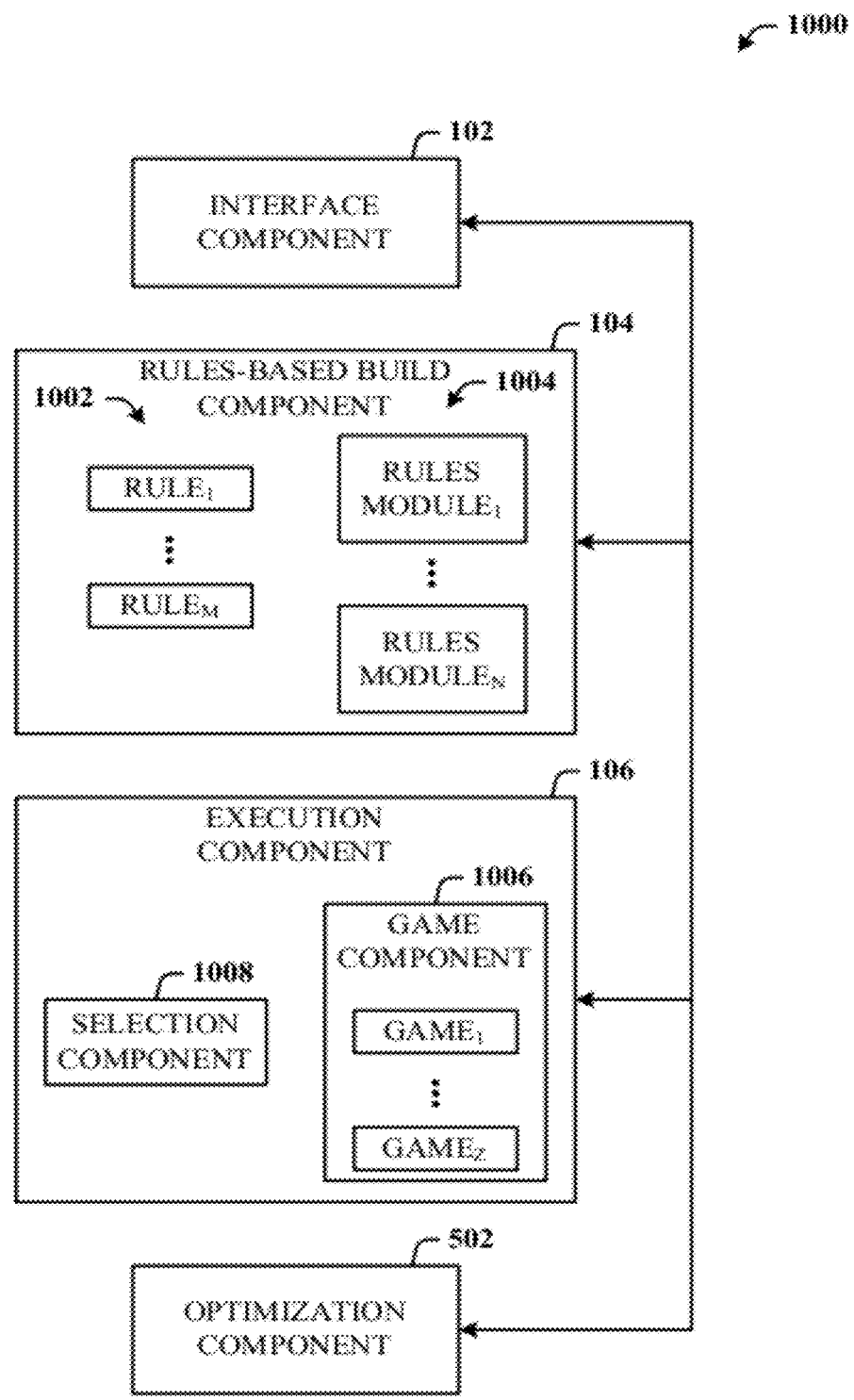
FIG. 10 illustrates a system showing more details to components thereof.

FIG. 10 illustrates a system 1000 showing more details to components thereof After a user accesses the system 1000 via the interface component 102, further access can be provided to the build component 104 where the user is presented with tools to create individual rules 1002 (denoted $RULE_1, \ldots, RULE_M$), and/or create modules, blocks or units of rules 1004 that execute as a unit (denoted $RULES\ MODULE_1, \ldots, RULES\ MODULE_N$), where M and N are integers. These rules 1002 and/or rule units 1004 can also be those that have been designed by the user or other users for execution during other games, and hence, can be reused for this game, provided they perform the desired function and output the desired result.

The execution component 106 can further include a game component 1006 and a selection component 1008. The game component 1006 can hold or store game information (denoted $GAME_1, \ldots, GAME_Z$, where Z is an integer) that facilitates the setup, configuration and/or execution of other games which can also employ the rules-based architecture of the invention. After a user accesses a website that hosts the rules-based gaming system 1000, the user can select a game (e.g., $GAME_1$) via the game component 1006. The selection component 1008 can then automatically communicate with the build component 104 for selection of the designated rules and/or rule units for execution during the associated game (e.g., $GAME_1$). Thus, if the user has changed a rule or rules since the last game execution, the changed rules will then be selected and executed this time for game play. The system 1000 can also include the optimization component 502 for optimization processing as described supra.

Figure 11:
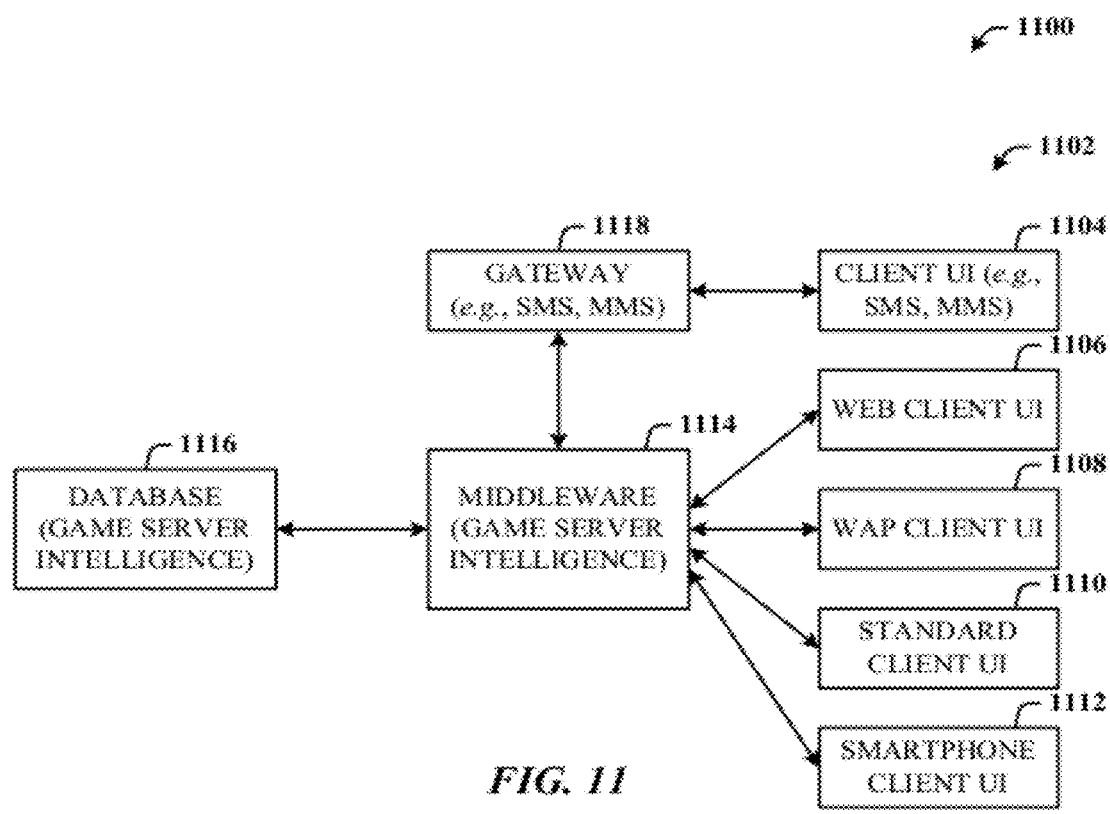
FIG. 11 illustrates a block diagram of a system that facilitates game execution and play.

FIG. 11 illustrates a block diagram of a system 1100 that facilitates game execution and play. The system 1100 shows three main components: a user interface (UI), for each of several different clients 1102, can be comprised of in the context of mobile communications, for example, a mobile phone text messaging command system (e.g., SMS-short message service) and/or multimedia messaging system (e.g., MMS-multimedia messaging service), a web-based mobile client UI 1106, a WAP (wireless application protocol) client UI 1108, a standard web client UI 1110, and a smartphone client UI 1112. The clients 1102 can interact with a middle layer (or middleware) API 1114 that provides an interface between the incoming messages received from the clients 1102 and a database 1116 (e.g., SQL) that maintains all the player and rule information. The game server intelligence or engine can reside in either or both of the middleware (web service) 1114 or/and database 1116 (e.g., as stored procedures).

Alternatively, the game server intelligence can reside in one or more of the clients 1102 where the network (and the middle layer 1114) is not available, or the network happened to fail for some reason. When the network-based service 1114 comes back online, gaming interaction can then resume via the network-based service. Accordingly, for this failsafe mechanism, the service 1114 can provide at least game play updates to the one or more clients as part of a background process that is transparent to the users. Thus, when the network service 1114 goes offline, play can resume in a peer-to-peer fashion with little or no interruption noticeable by the users. All clients 1102 can be used for game composition and/or game play. For the SMS client 1104, the client 1104 can interface to the middleware 1114 via a gateway 1118 that includes SMS capability. Alternatively, if utilizing MMS, the gateway 1118 can also include an MMS capability.

The system 1100 will support creation of rules for gaming that determine how the system reacts to input from player's mobile devices. These rules can take many forms, such as "if . . . then", where the system distributes content and/or takes other action, based on a game creator's specified condition. The rules, and the games themselves, are reusable, such that game creators can combine rules to form multi-tiered rules (the result of an "if . . . then" rule can be the activation of another rule) and new games or portions of games can be created from previously existing rules (a new game is built out of previously created rules that were contributed to the game playing community's stock of rules).

Once the game is composed, players play the game via their mobile devices in the physical world, with the game server automatically carrying out the game based on the rules specified.

As described herein, games can be built by combining rules. The system can provide atomic rule units, such as "if . . . then" and time trigger rules. Using the game creation tool, players can be assigned to roles and/or teams. The atomic rule units can consist of, but are not limited to, the following rule types:

(1) General message distribution. The system can simply send text, photo, audio, or other message type messages to some or all game players. For example, the system sends the message "Your scavenger hunt has begun. Reply with 'Join' to receive your first clue."

(2) If . . . then rules. When a specified condition is met, the game server executes a specified instruction. For example, if a member of Team A sends the word "troll", the server assigns a player on Team B the role of "troll".

(3) Time-based triggers. The system will execute a rule at a specified time. For example, the system sends a help message at a specified time to players/teams that have fallen behind in the game.

(4) Location-based triggers. The system will execute a rule when a player/team is at a specified location. For example, the system sends a confirmation message that the player has reached a specified location, when, in fact, he or she has reached that location.

(5) Role assignment/modification. Players can have roles that have properties. For example, players assigned the roll of "troll" can only roll certain dice roll values.

(6) Dice rolls (randomization). The system can implement randomization. For example, if a player reaches Location X, the system can automatically randomize other locations in the game before selecting and communicating a new location for the player to go to next.

(7) Rule creation or addition. The output of a rule can be to create a new rule based on incoming information or to combine two or more existing rules. For example, a member of Team A sends in a photograph of her current location, in response to which the system creates a new rule to the effect that a member of Team B is supposed to attempt to locate Team A, thereby creating a mixed virtual-physical game of mobile tag.

The game intelligence can reside in either the database system 1116, the middleware system 1114, or in the case of a non-client/server model, on each individual mobile device of the game players (peer-to-peer model). A single mobile device can also take on the role of the "server", thus hosting the game intelligence and any necessary data.

As an example, in the case of the game intelligence residing in the database 1116 (e.g., a SQL database system), the rules can be implemented in SQL code as triggers, jobs, stored procedures, etc., and can operate in conjunction with a web service (or similar middleware). When a user sends a message to the system, it calls an API in the middleware 1114 that parses it, and examines it against the rules of the game to decide what action to take. If the rule needs to be submitted to the database 1116 or a new rule from the database 1116 needs to be executed, the middleware 1114 will call the appropriate stored procedure to interact with the database 1116 accordingly.

As described herein, users can play games using SMS text messaging. Although limited in functionality (e.g., the SMS user cannot send or receive photos), they can, for example, send text messages to indicate responses or locations that the server parses and responds to appropriately. This can require the gateway 1118 to the middleware 1114. SMS text messages are received in the SMS gateway 1118 and sent to the system middleware 1114 for processing. If a return message is needed based on the game rules, it will be retrieved from the database 1116 by the middleware 1114 and sent out to the player or group of players via the SMS gateway 1118.

Smartphone users can have a dedicated client application for game play. Transmission between phone and server 1114 can use any protocol, such as HTTP (HyperText Transfer Protocol). The smartphone client 1112 is fully featured, and can communicate all content types with the server 1114, including location information, if location functionality is available on the smartphone device.

Games can be played via web browsers by way of the standard web clients 1106, either at a desktop or on a mobile device using the device's web browser. The game play experience via the browser is fully functional and is similar to that of the dedicated smartphone client 1112.

The game builder and game play architecture disclosed herein also addresses a second issue common to many conventional game systems: automated game play. Once the game has been composed, it is played via participant mobile devices and/or mobile-capable computing systems/devices, which send content to a server that houses the game's rules, and can trigger the distribution of new content, rules, or any other information based on content it receives. For example, the scavenger hunt style game may contain a rule that when a player sends in a message containing a word that solves one part of the scavenger hunt, the system responds by sending out to appropriate player mobile phones the next clue in the scavenger hunt sequence.

Figure 12:
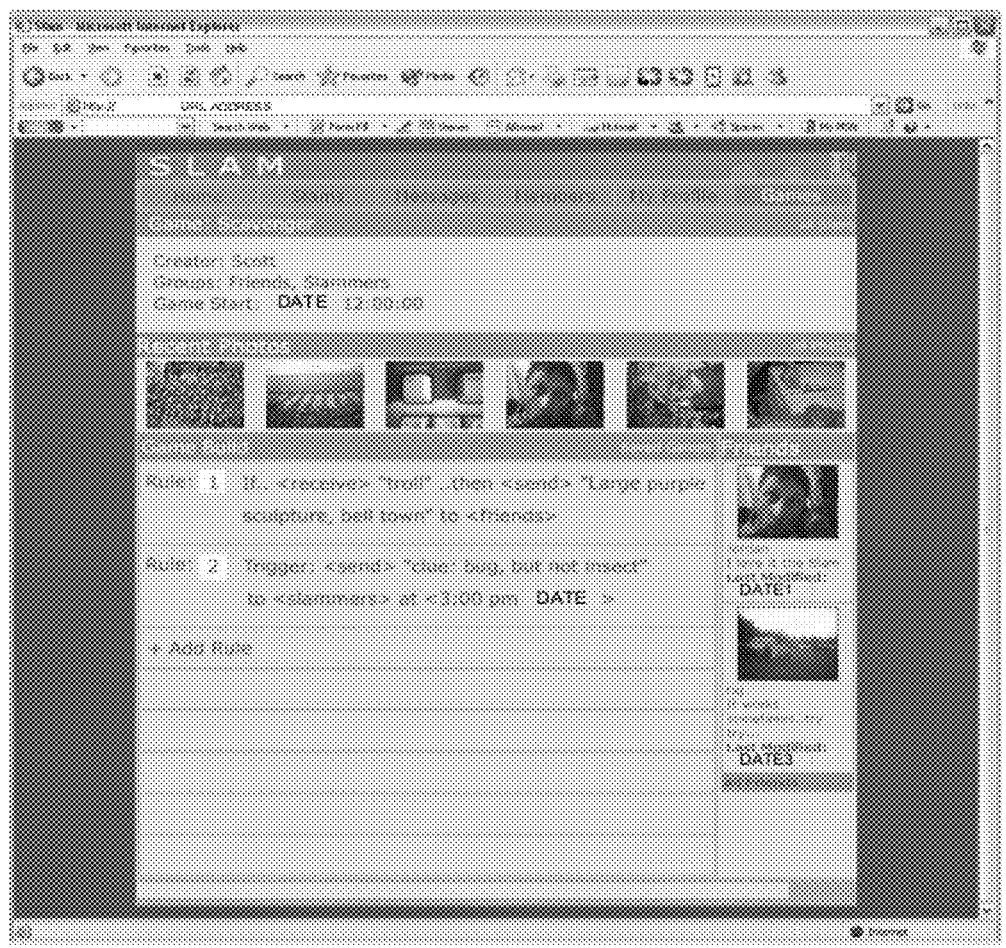
FIG. 12 illustrates an example UI for game creation.

FIG. 12 illustrates an example UI 1200 for game creation. Here, a Rule 1 and a Rule 2 are shown during the build process. As indicated supra, either one of the rules could have been used in another game, and simply imported into this game for reusable execution. As indicated, additional rules can be added.

Figure 13:
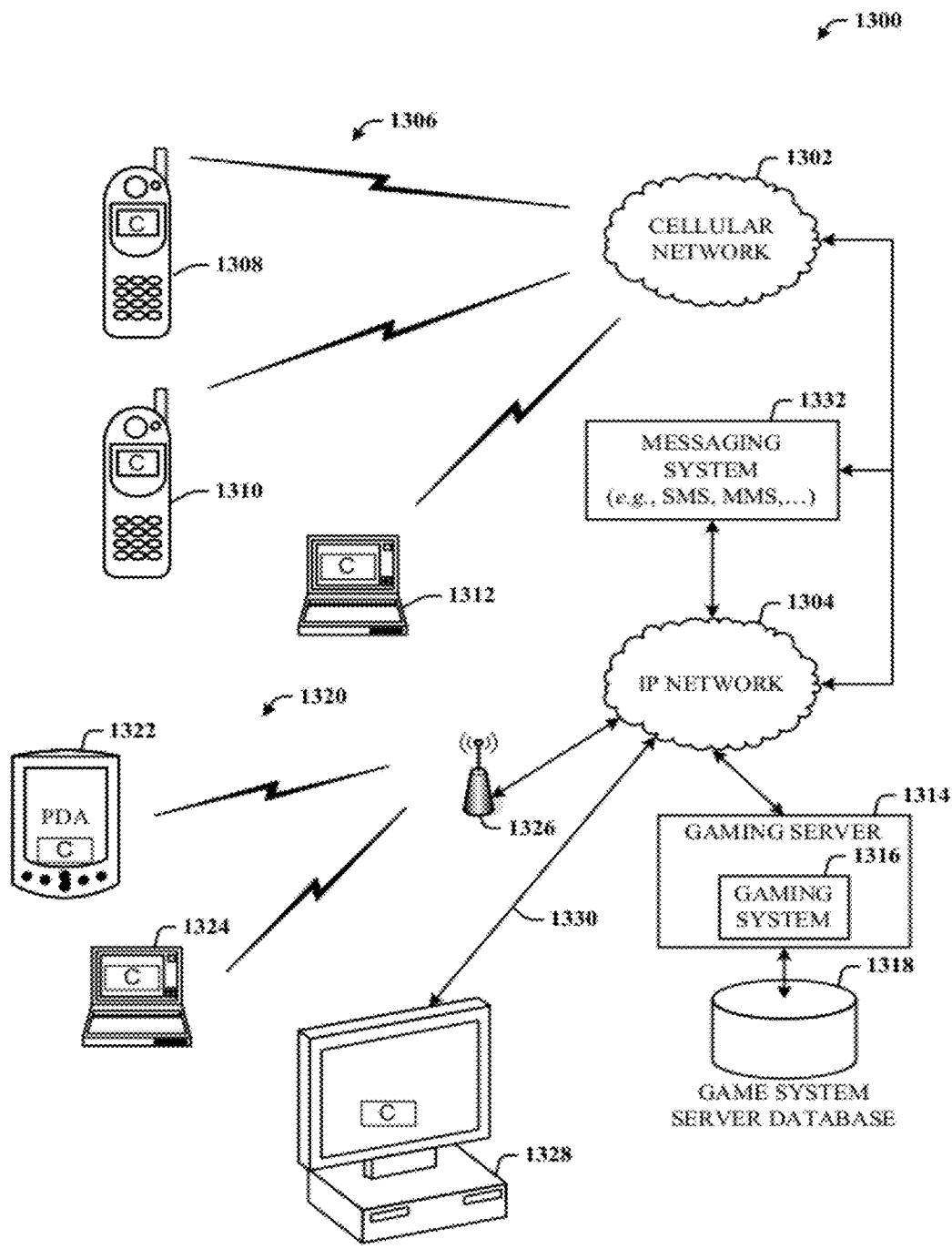
FIG. 13 illustrates a block diagram of a network that supports physical-virtual gaming and game building in accordance with the subject innovation.

FIG. 13 illustrates a block diagram of a network 1300 that supports physical-virtual gaming and game building in accordance with the subject innovation. The system 1300 can include a cellular network 1302 in communication with an IP network 1304 (e.g., the Internet) such that users on one of the networks (1302 or 1304) can access services provided on the other network (1304 or 1302). As illustrated, devices 1306 are clients of the cellular network 1302. That is, first and second cell phones or cellular communications-capable devices (1308 and 1310) are in communication with the cellular network 1302, as well as a portable computing device 1312 that includes cellular network communications capability. The users of such devices 1306 can access the IP network 1304, and more specifically, a gaming server 1314 that hosts a gaming system 1316 the capabilities of which are described herein in accordance with the innovation. The gaming server 1314 also has associated therewith a gaming database 1318 that can store game-related information such as the game, rules, player information, for example.

Clients 1320 of the IP network 1304 can also participate and gain the benefits of the disclosed gaming architecture. For example, a PDA device 1322 and a portable computer 1324 can access the gaming server 1314 wirelessly via an access point 1326 of the IP network 1304, and a desktop computer 1328 can access the same gaming server 1314 for game play via a wired connection 1330.

Thus, the cellular clients 1306 can build games and participate in the same game as the IP clients 1320. Additionally, the cellular clients 1306 can interact with the game during game play using text messaging (e.g., SMS) and/or multimedia messaging (e.g., MMS). SMS can be facilitated by a messaging system gateway 1332 that provides a suitable messaging interface between the cellular network 1302 and the IP network 1304.

Alternatively, and in accordance with an innovative aspect, game building and game execution can occur in a peer-to-peer environment. Accordingly, the gaming server 1314 can be bypassed. The client (denoted by a capital "C") in each or some of the devices (1306 and 1320), and suitable for both a client/server implementation and a peer-to-peer environment, can host the system 100 of FIG. 1, the system 500 of FIG. 5, or system 1000 of FIG. 10 to facilitate rules construction, game building and game execution.

In a brief, but not all-inclusive summary, the instant gaming innovation targets mobile devices for mixed physical-virtual gaming. Games can be built from atomic rule-based gaming units and, games and rules can be made reusable. Additionally, rules can be combined into blocks or units and executed as such. Game play is automated in that it does not require human oversight and, game creation and play can take place on any number of clients, and can be client/server and/or peer-to-peer.

Figure 14:
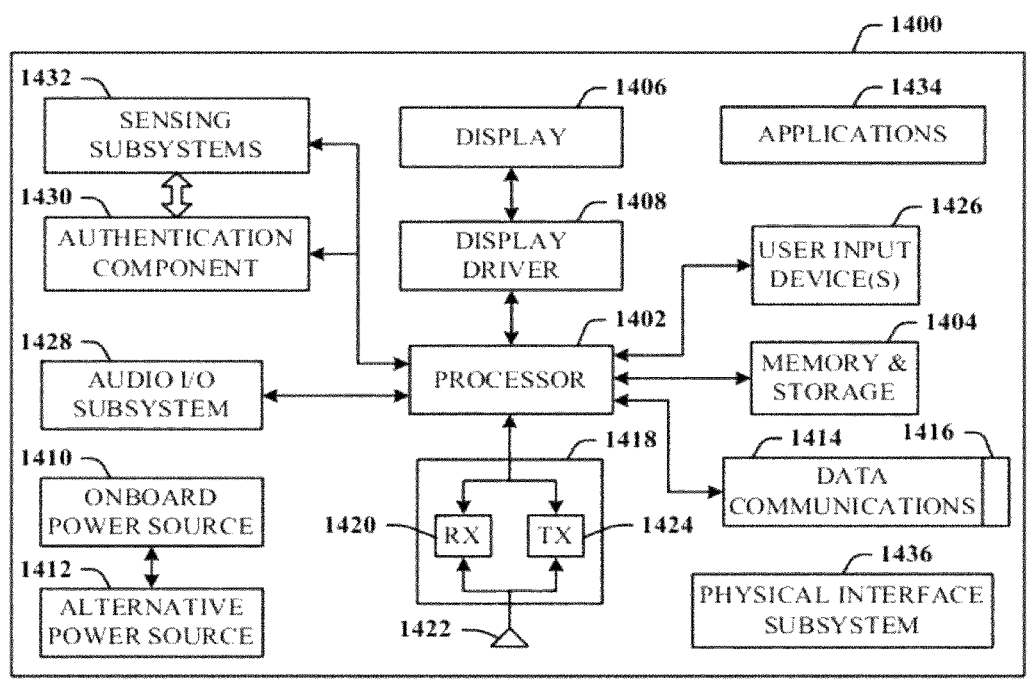
FIG. 14 illustrates a schematic block diagram of a portable wireless device that facilitates physical-virtual game building and play according to an aspect of the subject innovation.

FIG. 14 illustrates a schematic block diagram of a portable wireless device (PWD) 1400 (e.g., a cell phone) that facilitates physical-virtual game building and play according to an aspect of the subject innovation. The device 1400 includes a processor 1402 that interfaces to one or more internal components for control and processing of data and instructions. The processor 1402 can be programmed to control and operate the various components within the device 1400 in order to carry out the various functions described herein. The processor 1402 can be any of a plurality of suitable processors (e.g., a DSP-digital signal processor), and can be a multiprocessor subsystem.

A memory and storage component 1404 interfaces to the processor 1402 and serves to store program code (e.g., rules), and also serves as a storage means for information such as data, client applications, services, metadata, device states, and the like. The memory and storage component 1404 can include non-volatile memory suitably adapted to store at least a complete set of the sensed input data (e.g., camera images, audio data, . . . ) that is acquired from a sensing subsystem and/or sensors 1432. Thus, the memory 1404 can include RAM and/or flash memory for high-speed access by the processor 1402 and/or a mass storage memory (e.g., a micro drive) capable of storing gigabytes of data that comprises text, images, audio, and/or video content. According to one aspect, the memory 1404 has sufficient storage capacity to store multiple sets of information relating to disparate services, and the processor 1402 can include a program that facilitates alternating or cycling between various sets of information corresponding to the disparate services.

A display 1406 can be coupled to the processor 1402 via a display driver subsystem 1408. The display 1406 can be a color liquid crystal display (LCD), plasma display, touch screen display, or the like. The display 1406 functions to present data, graphics, or other information content for game play and rules building. Additionally, the display 1406 can present a variety of functions that are user selectable and that provide control and configuration of the device 1400. In a touch screen example, the display 1406 can display touch selectable icons that facilitate user interaction for control and/or configuration.

Power can be provided to the processor 1402 and other onboard components forming the device 1400 by an onboard power system 1410 (e.g., a battery pack or fuel cell). In the event that the power system 1410 fails or becomes disconnected from the device 1400, an alternative power source 1412 can be employed to provide power to the processor 1402 and other components (e.g., sensors, image capture device, ... ) and to charge the onboard power system 1410, if a chargeable technology. For example, the alternative power source 1412 can facilitate interface to an external a grid connection via a power converter. The processor 1402 can be configured to provide power management services to, for example, induce a sleep mode that reduces the current draw, or to initiate an orderly shutdown of the device 1400 upon detection of an anticipated power failure.

The device 1400 includes a data communications subsystem 1414 having a data communications port 1416, which port 1416 is employed to physically interface the device 1400 to a remote computing system, server, service, or the like. The port 1416 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 1414 can include SIM (subscriber identity module) data and the information necessary for cellular registration and network communications.

The device 1400 can also include a radio frequency (RF) transceiver section 1418 in operative communication with the processor 1402. The RF section 1418 includes an RF receiver 1420, which receives RF signals from a remote device (e.g., another client device when operating in peer-to-peer gaming mode) or system (e.g., cell network) via an antenna 1422 and can demodulate the signal to obtain digital information modulated therein. The RF section 1418 also includes an RF transmitter 1424 for transmitting information (e.g., data, service(s)) to a remote device (e.g., another client device when operating in peer-to-peer gaming mode) or system, for example, in response to manual user input via a user input device 1426 (e.g., a keypad), or automatically in response to detection of entering and/or anticipation of leaving a communication range or other predetermined and programmed criteria.

The device 1400 can also include an audio I/O subsystem 1428 that is controlled by the processor 1402 and processes voice input from a microphone or similar audio input device (not shown). The audio subsystem 1428 also facilitates the presentation of speech and audio output signals via a speaker or similar audio output device (not shown).

The device 1400 can also include an authentication component 1430 that interfaces to the processor, and facilitates authentication of a user to the device itself and/or to a remote system. The processor 1402 also interfaces to the sensing subsystems block 1432 that facilitates the capture and input of the OCR data, voice data, handwriting data, and image/video data, for example, for determination of user context and/or concept. Additionally, the device 1400 includes one or more applications 1434 (e.g., imaging program, video presentation program, OCR program, search engine, gaming client, ... ) that can be launched to enable operation of the device sensing systems for receiving sensed input data and game building and execution in accordance with the innovative architecture. The applications can also includes programs for phonemic and language model creation and updating, and inference analysis and selection.

The device 1400 can also include a physical interface subsystem 1436 that allows direct physical connection to another system (e.g., via a connector), rather than by wireless communications or cabled communications therebetween.

Figure 15:
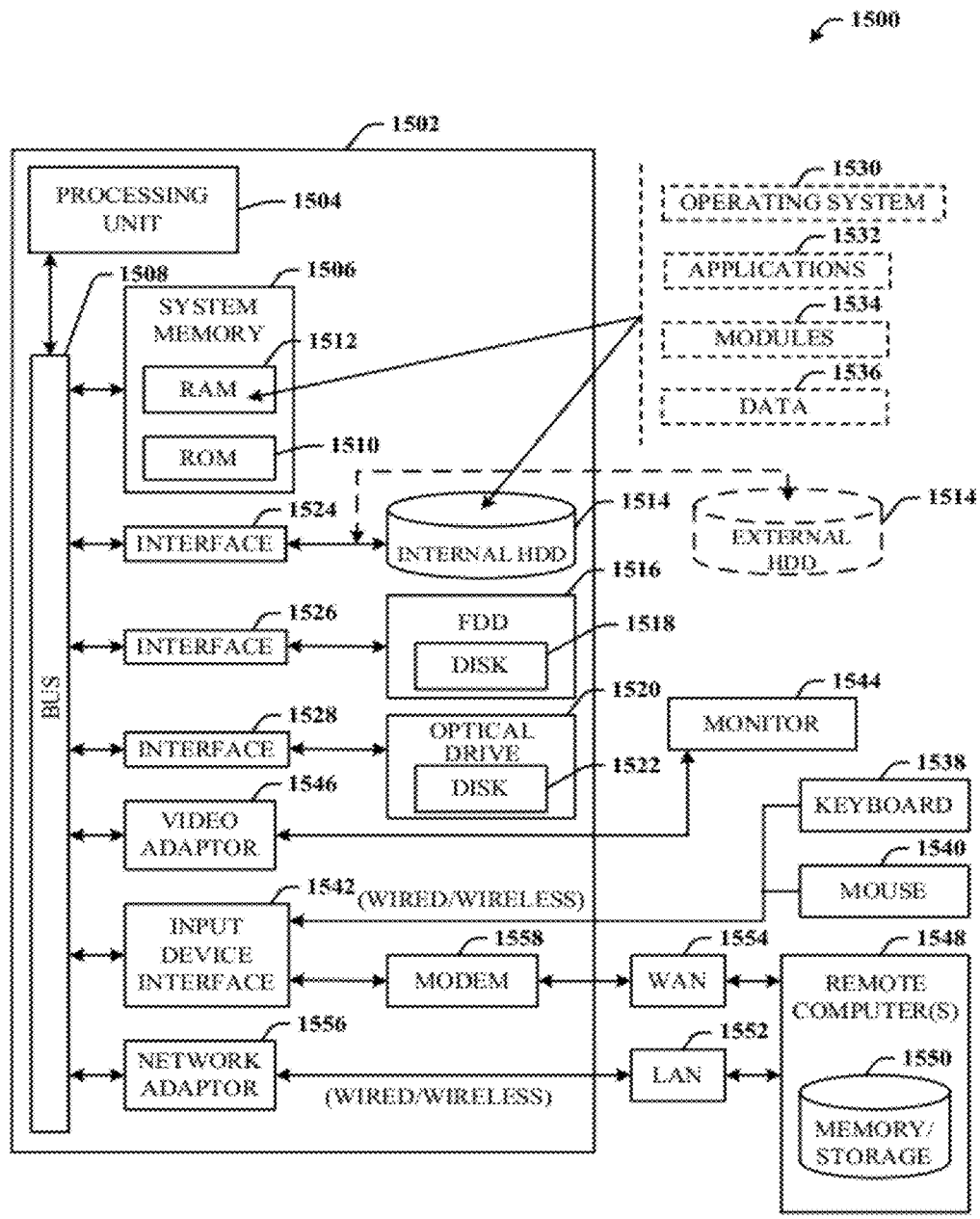
FIG. 15 illustrates a block diagram of a computer operable to execute the disclosed game building and execution architecture.

Referring now to FIG. 15, there is illustrated a block diagram of a computer operable to execute the disclosed game building and execution architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and/or communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other non-transmission medium that can be used to store the desired information and for access by the computer. In contrast, communication media may embody computer readable instructions, data structures, program modules, or other data in a modulated data signal, such as a carrier wave, or other transmission mechanism. As defined herein, computer storage media does not include communication media.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 16:
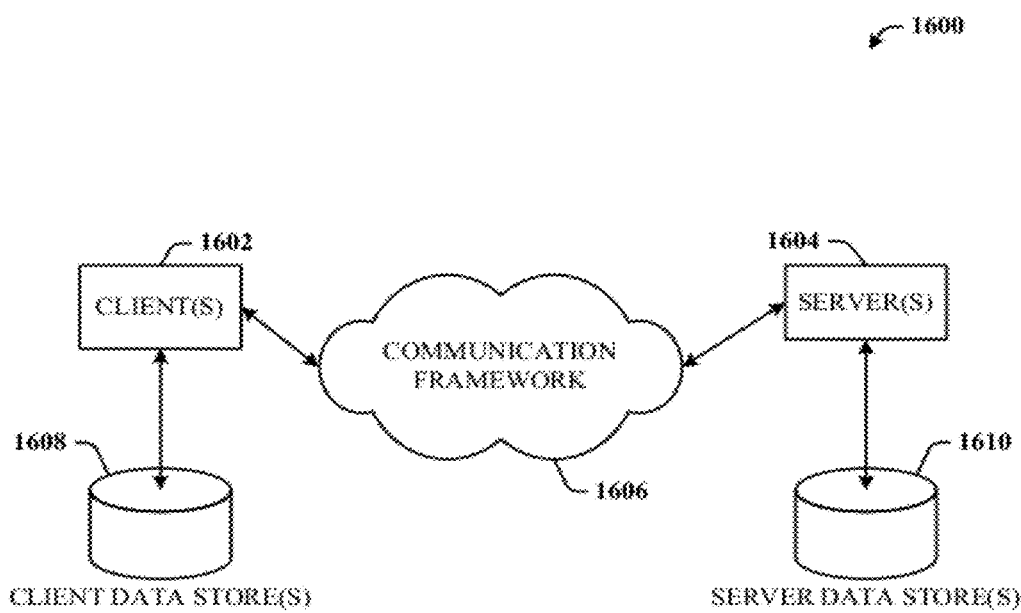
FIG. 16 illustrates a schematic block diagram of an exemplary computing environment for game building and game execution in accordance with another aspect.

Referring now to FIG. 16, there is illustrated a schematic block diagram of an exemplary computing environment 1600 for game building and game execution in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method comprising:
   providing a web-based interface to a plurality of participants of a game for the creation of a plurality of rules by at least one of the plurality of participants, the plurality of rules defining the game;
   receiving game data from at least one mobile participant gaming device, the received game data including information indicating a physical location of the at least one mobile participant gaming device;
   processing the received game data to select at least one rule from the plurality of rules, wherein the at least one rule is a conditional rule based at least in part on the information indicating the physical location of the at least one mobile participant gaming device; and
   distributing, via a mobile communication network, the selected at least one rule to the at least one mobile participant gaming device.

2. The method of claim 1, further comprising distributing the selected at least one rule to the at least one mobile participant gaming device based at least in part on a time-based rule trigger.

3. The method of claim 1, wherein the plurality of rules are reusable as part of a future game.

4. The method of claim 1, wherein the received game data further includes text that, when parsed by an execution component, provides a keyword that aids in selection of the at least one rule.

5. The method of claim 1, wherein the received game data further includes image data, the method further comprising:
   comparing the image data to pre-stored image data; and
   selecting the at least one rule based at least in part on the comparing that yields an association between the image data and the pre-stored image data.

6. The method of claim 1, further comprising ordering one or more of the plurality of rules for execution during game play.

7. The method of claim 1, wherein the received game data includes a physical world element that satisfies an existing rule and the at least one rule is selected and distributed to the at least one mobile participant gaming device based at least in part on the physical world element.

8. One or more computer storage media comprising instructions that, when executed on one or more processors, perform the operations in claim 1.

9. A method comprising:
   creating a plurality of rules for a game, the plurality of rules including at least a first rule;
   receiving game data from a mobile gaming device, the received game data including information associated with the first rule indicating a physical location of the mobile gaming device;
   processing the received game data to determine if the received game data satisfies the first rule; and
   when the received game data satisfies the first rule, modifying the plurality of rules based in part on game progress to generate a modified plurality of rules, the modified plurality of rules including at least a second rule, the second rule being a conditional rule based at least in part on the information indicating the physical location of the mobile gaming device; and
   distributing, via a mobile communication network, the second rule to the mobile game device.

10. The method of claim 9, further comprising creating the second rule such that the second rule is a new rule added to a plurality of rules.

11. The method of claim 9, wherein the second rule is selected from the plurality of rules.

12. The method of claim 9, further comprising distributing the second rule to the mobile gaming device based at least in part on a time-based trigger.

13. The method of claim 9, wherein the time-based trigger specifies a certain time when the second rule can be distributed.

14. The method of claim 9, wherein the received game data further includes text that, when parsed by an execution component, provides a keyword that aids in determining if the received game data satisfies the first rule.

15. The method of claim 9, wherein the received game data further includes image data corresponding to the physical location of the mobile gaming device, the method further comprising:
   comparing the image data to pre-stored image data; and
   determining that the received game data satisfies the first rule based at least in part on the comparing that yields an association between the image data and the pre-stored image data.

16. One or more computer storage media comprising instructions that, when executed on one or more processors, perform the operations in claim 9.

17. A system, comprising:
one or more processors;
a memory, coupled to the one or more processors, storing:
   a build component, operable by the one or more processors, that facilitates construction of a plurality of rules for a game;
   an optimization component that alters the execution order of the plurality of rules based in part on a number of participants playing the game and in part on types of the gaming devices being utilized during the game;
   an execution component, operable by the one or more processors, that receives physical location information as game data from one or more gaming devices and selects a conditional rule from the plurality of rules based at least in part on the physical location information; and
   an interface component, operable by the one or more processors, that sends the conditional rule to the one or more gaming devices.

18. The system of claim 17, wherein the interface component sends the conditional rule to the one or more gaming devices based at least in part on a time-based trigger.

19. The system of claim 17, wherein the plurality of rules are maintained by the system such that the plurality of rules can be reused as part of a future game.

20. The system of claim 17, wherein the one or more gaming devices are mobile devices.

* * * * *